Aug. 4, 1931.    F. A. SMITH ET AL    1,817,497
BAND LOCK
Filed Dec. 14, 1928    2 Sheets-Sheet 1

Inventors
F. A. SMITH
C. H. NEHLS
By Bacon & Thomas
Attorneys

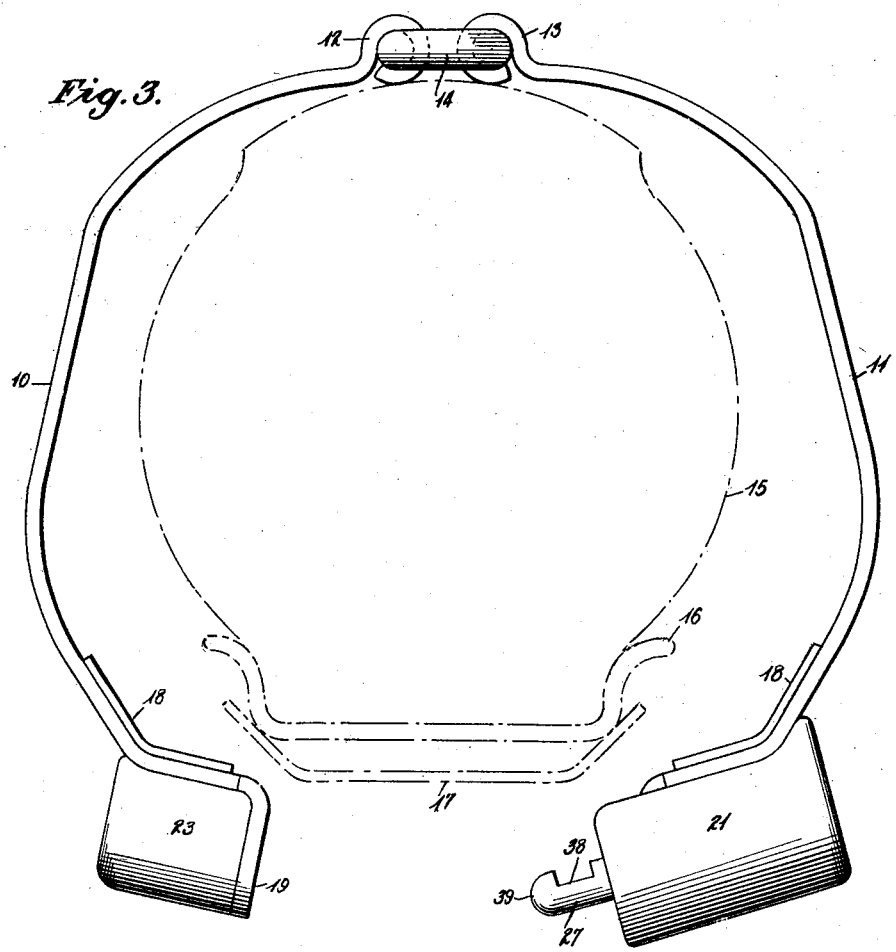
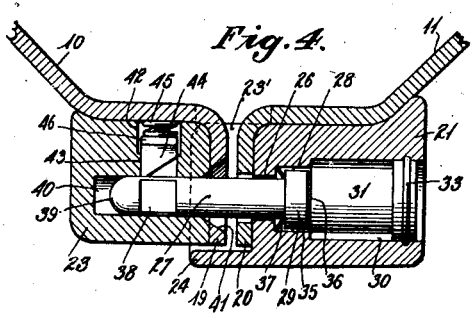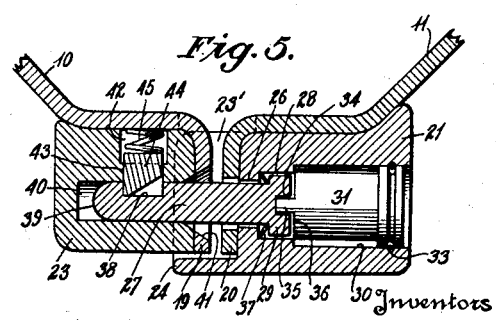
F. A. SMITH
C. H. NEHLS

Patented Aug. 4, 1931

1,817,497

UNITED STATES PATENT OFFICE

FREDERICK A. SMITH AND CHARLES H. NEHLS, OF INDIANAPOLIS, INDIANA, ASSIGNORS, BY MESNE ASSIGNMENTS, TO OAKES PRODUCTS CORPORATION, A CORPORATION OF MICHIGAN

BAND LOCK

Application filed December 14, 1928. Serial No. 326,094.

This invention relates to band locks, and more particularly to the type adapted for securing portable articles, such as automobile accessories, spare tires, and the like.

The band lock according to the present invention comprises a pair of strap members pivoted together, the free end of one strap carrying the lock mechanism, and the free end of the other carrying an abutment adapted to be engaged thereby. The two strap members together form a band which is adapted to encircle the object to be secured, when the parts are in the locked position.

The objects of the invention are to provide a device of the character described which is thief-proof and at the same time simple in construction and operation, which will require a minimum amount of manipulation for locking and unlocking, having no loose parts to become lost or disassembled, and otherwise peculiarly adapted for the purpose intended.

Other objects and features of novelty will be apparent as the following description proceeds, as taken in conjunction with the accompanying drawings, in which one embodiment of our invention is shown by way of illustration, and in which:

Fig. 1 shows a band lock according to the present invention, as applied to the spare tire of an automobile, the tire and its accessories being shown in dotted section, and the band lock being shown in elevation, in the locked position;

Fig. 2 is a side elevation of the structure shown in Fig. 1;

Fig. 3 is a view similar to Fig. 1, but showing the parts in unlocked position;

Fig. 4 is a detailed sectional view of the locking mechanism, in the unlocked position; and, Fig. 5 is a similar view showing the parts in a locked position.

Referring more particularly to the drawings, the band which encircles the object to be secured comprises a pair of strap members 10 and 11, preferably formed of sheet metal of uniform thickness and width, and shaped to substantially conform to the contour of the article to be secured. In the embodiment shown, these members are of substantially equal length and symmetrical, although this feature is not essential. The upper ends of the members 10 and 11 are respectively rolled over as at 12 and 13, forming a pivotal connection to receive a rectangular link 14. This arrangement permits limited vertical movement of the members 10 and 11, with respect to each other, but constrains them to movement in a common transverse plane.

The device has been illustrated in connection with a spare tire 15 mounted on a rim 16 carried by the tire carrier 17. The lower portions of the strap members 10 and 11 are shaped to fit under the tire carrier 17, and are each provided with a liner 18 of anti-squeak material. The extreme lower ends of the members 10 and 11 are bent downwardly forming flanges 19 and 20 which in the locked position shown in Fig. 1 are substantially parallel to each other, and in slightly spaced relation.

The lower end of the member 11 carries a pad 21, secured in any desired manner as by rivets 22. This pad carries the locking mechanism. A corresponding pad 23 is carried by the lower end of the strap member 10, and is adapted to receive the bolt by which the parts are locked together.

The details of the lock mechanism are best shown in Figs. 4 and 5. The inner end of the pad 21 is recessed as at 23′, forming a flange 24 which surrounds the mating end of the pad 21. A longitudinal bore passes through the pad 21 and is of smallest diameter at the reduced portion 26, at its inner end to receive the lock bolt 27. A portion of the bore is enlarged, forming an annular recess 28 which receives the enlarged head 29 of the bolt 27. The remainder of the bore is of still larger diameter forming a recess 30 which receives a lock cylinder 31.

The lock cylinder 31 may be of the tumbler, or other desired construction, and forms no part of the present invention other than that it is operable by key inserted through the slot 32, and cannot be otherwise rotated. The lock cylinder 31 is retained in the bore 30 by means of a snap ring 33.

The bolt head 29 is provided with a central transverse rectangular slot 34, and the outer portions of the inner end of the cylinder 31 are slabbed off as at 36, leaving a central rectangular key 35 adapted to fit in the slot 34. A spring washer 37 placed under the bolt head 29 serves to keep the key 35 snugly fitted in the slot 34.

The bolt 27 extends inward well beyond the end of the flange 24, where it is provided with a transverse channel or notch 38. The inner end of the bolt is rounded off as at 39.

The mating pad 23 is drilled only part way through to form a recess 40, which receives the bolt 27 when the parts are in the locked position. The outer end of the bore 40 is countersunk as at 41 so that the rounded end 39 of the bolt 27 may be readily fitted into position. A vertical bore 42 communicates with the bore 40. The lower end of this bore is rectangular as at 43, in which is mounted a locking detent 44. A coil compression spring 45 normally urges the detent downward to enter the channel 38 when the parts are in the locked position shown in Fig. 5. The detent is provided with a head 46 which limits its downward movement.

When the parts are in the position shown in Figs. 1 and 5, and a key is inserted in the slot 32, turning of the cylinder 31, by means of the tongue 35 in the slot 34 will turn the bolt 27. The edge of the slot 38 will accordingly force the detent into the retracted position until it is clear of the bore 40. This will permit the bolt 27 to be withdrawn and the pads 21 and 22 separated. The entire band lock may thus be bodily removed.

When the band lock is again applied to the tire and the free ends pass under the carrier, the rectangular link 14 will constrain the pads 21 and 22 to horizontal alignment, but will permit a certain amount of vertical play so that the rounded end 39 of the bolt 27 by virtue of the countersunk portion 41 will substantially automatically find its way into the bore 40. The rounded end 39 riding on the inclined portion of the detent 44 will force it back against the action of the spring 45 until the parts reach the position shown in Fig. 5 when it will snap down into the slot 38 and thus lock the parts together.

It should be noted that the flange 24 overlying the pad 22 prevents the insertion of a wedge or other instrument for prying the ends of the band apart thus preventing forcing of the lock, as well as protecting the parts from dust or foreign matter which might clog the parts. Furthermore, the bolt 27 passes through both downturned flanges of the respective strap members so that mere shearing of the rivets 22 would not free the bands. The flange 24 and the tire carrier 17 prevent turning of the lug 22, in this event, so that it is impossible to open the band without the key.

While one emodiment of the invention has been illustrated and described in considerable detail for the purposes of complete disclosure, the details are given in an illustrative, and not in a limiting sense, and the invention is not limited to the specific form disclosed, but includes such modifications and embodiments of the broad idea as come within the scope of the appended claims.

Having thus described the invention, what we claim as new and desire to secure by Letters Patent of the United States is:

1. A band lock of the character described, comprising in combination, a pair of strap members having their ends pivoted to a link, a pad carried by the free end of one of said members containing a bolt and locking mechanism, a pad carried by the free end of the other of said members adapted to receive said bolt, means in said last named pad coacting with the bolt adapted to retain the free ends of the members in locked position, and means actuated by said locking mechanism for releasing said means.

2. A device of the character described, comprising in combination, a pair of strap members pivoted together, a lock pad carried by the free end of one, a detent pad carried by the free end of the other, the ends of the strap members forming depending flanges adapted to lie between said pads when in locked position, and a bolt passing through said flanges and pads.

3. A band lock comprising a pair of curved strap members having their upper ends pivoted together and their lower ends brought together and bent downward forming abutting flanges, a pad secured against the outer side of each flange, one pad carrying locking mechanism and the other carrying a detent, and a bolt controlled by said locking mechanism and passing through said flanges to engage the detent.

4. A device of the character described, comprising in combination, a strap having at its ends a pair of pads adapted to be locked together, means for preventing relative rotation of the strap ends when in locked position, a common bore through said pads adapted to receive a bolt, a detent in one of said pads normally projecting into said bore to engage a notch in said bolt, the bore in the other pad having an annular recess to receive the head of said bolt, and a lock cylinder in the outer end of said bore having a key engagement with said bolt head.

5. A device of the character described, comprising in combination, a band adapted to surround the portable article to be secured, and having its ends turned outwardly, forming abutting flanges, securing means passing through said flanges and releasable by a key and means for preventing any movement of said securing means without the key, said means comprising a metal pad on the outer side of each of said flanges and enveloping the portion of the securing means extending therebeyond, said securing means comprising a bolt having a notch in one side, and a detent adapted to enter said notch, and key operated means for turning said bolt to rotate the notch out of the path of said detent.

6. A device of the character described comprising in combination a strap member, a lock pad secured to one end of said strap member and a latch pad secured to the other end of said strap member, a lock bolt anchored in said lock pad against outward axial movement and having a latch notch at its outer end, said latch pad adapted to receive the latch end of said bolt and having latch mechanism for engaging said notch in interlocking engagement, and a lock structure in said lock pad forming a closure against access to said lock bolt and having connection with said bolt, said lock structure being operable solely by a key for causing turning of said bolt and release thereof from said latch mechanism and latch pad.

7. A device of the character described comprising in combination a strap member, a lock pad secured to one end of said member and a latch pad secured to the other end of said member, said lock pad having a bore, a lock bolt anchored at the inner end of said bore and extending therefrom for projection into said latch pad, means for interlatching said bolt and latch pad upon entry of the bolt into said latch pad, said latch engagement being releasable upon rotation of said bolt, and a lock structure closing the outer end of said bore to prevent access to said bolt, said lock structure being operable to cause rotation of said bolt and thereby release of the interlatching engagement between the bolt and latch pad.

8. A device of the character described comprising in combination a strap member, a lock pad secured to one end of said member, a latch pad secured to the other end of said member, the end of said strap member being deflected to form depending flanges adapted to lie between said pads when in locked position, a locking bolt anchored in said lock pad and extending therefrom for engagement with said latching pad, and a lock structure on said lock pad key-controlled to move said bolt to release it from said latch pad.

In testimony whereof we affix our signatures.

FREDERICK A. SMITH.
CHARLES H. NEHLS.